United States Patent [19]

Pricer

[11] 3,882,467

[45] May 6, 1975

[54] COMPLEMENTARY FIELD EFFECT TRANSISTOR MEMORY CELL

[75] Inventor: Wilbur David Pricer, Burlington, Vt.

[73] Assignee: International Business Machines Corporation, Armonk, N.Y.

[22] Filed: Dec. 20, 1973

[21] Appl. No.: 426,889

[52] U.S. Cl. ........ 340/173 R; 307/288; 340/173 FF
[51] Int. Cl. .......... G11c 11/40
[58] Field of Search .......... 340/173 R, 173 FF; 307/238, 279, 288

[56] References Cited

UNITED STATES PATENTS 3,533,087 10/1970 Zuk .......... 340/173 R

*Primary Examiner*—Terrell W. Fears
*Attorney, Agent, or Firm*—Howard J. Walter, Jr.

[57] ABSTRACT

A complementary MOS field effect transistor memory cell is described in which only four devices are interconnected to form a DC stable non-destructive readout circuit. Power consumption during the quiescent, or standby, state is minimum, being limited only by parasitic leakage current. High performance with minimum geometry are provided through the use of a variable source-to-substrate bias which allows field effect devices to operate in enhancement and depletion mode during standby and selection times, respectively. An array of the cells may be arranged in a word-organized memory.

12 Claims, 4 Drawing Figures

COMPLEMENTARY FIELD EFFECT TRANSISTOR MEMORY CELL

BACKGROUND OF THE INVENTION

1. Field of the Invention

This invention relates to memory cells for storing binary data and more particularly to field effect integrated circuit non-destructive readout memory cells comprising complementary devices.

2. Description of the Prior Art

Semiconductor device circuits which store electrical energy in various forms to provide non-destructive sensing are well known in the art and form an integral part of the storage systems used in computer memories. Various MOSFET non-destructive readout memory circuit configurations have been previously proposed, see for example the article "MOSFET Memory Circuits," L. M. Terman, "Proc, IEEE," Vol. 59, No. 7, Pgs. 1044–1058 (1971). The choice of a particular memory circuit configuration is determined by various cost/performance considerations. In view of these considerations, the use of non-complementary device circuits such as the well known six-device cell, described in "IBM Technical Disclosure Bulletin," Vol. 8, No. 12, May 1966, Pgs. 1838–9 of P. Pleshko, and the four-device cell, described in U.S. Pat. No. 3,541,530 to Spampinato et. al., and assigned to the assignee of the instant invention, have usually been preferred over complementary device cells.

A basic complementary device memory cell, described in U.S. Pat. No. 3,431,433, comprises a pair of complementary inverter circuits in which the output of one inverter is connected in feedback fashion to the input of the other inverter. Data is sensed by detecting the presence of a voltage on the node at one or both of the inverter outputs. The circuit utilizes a minimum of standby power because one of the series connected complementary devices in each inverter pair is always off. However, in order to achieve necessary high performance and nondestructive readout, prior art complementary cells require additional switching devices, thereby undesirably increasing the physical size, and layout area, of each memory cell.

Prior art four-device complementary non-destructive readout memory cells have been proposed which provide for sensing of current flow, under specified bias condition, through the series connected complementary devices forming the inverters, see for example, the circuit described in U.S. Pat. No. 3,533,087 to Zuk and the circuit described in commonly assigned U.S. Pat. No. 3,535,699 to Gaensslen et al. The former circuit provides for non-destructive sensing by utilizing a partial write condition to produce a small sense current. In addition to being slow in readout, the circuit requires critical device parameters and complex control signals to operate efficiently. The latter circuit requires two intentionally introduced leakage paths designed for worse case conditions to sustain the state of the cell in the standby mode, and, therefore, uses more than a minimum of power.

In summary, prior art non-destructive read out complementary memory cells have not been competitive in the area of power consumption, layout size and control signal simplicity with non-complementary cells, due primarily to a requirment for additional devices or the inability to utilize minimum device geometry.

SUMMARY OF THE INVENTION

It is, therefore, an object of this invention to provide a non-destructive readout complementary transistor memory cell capable of utilizing minimum device geometry to provide a reduction in the required layout area for each cell.

It is another object of this invention to eliminate the necessity for complicated control signals in order to provide a minimum number of active devices in complementary device memory cell.

It is further object to provide a high performance memory cell utilizing minimum power in the standby mode.

The storage cell of the instant invention, in its broadest aspect, comprises four transistors arranged in two branch circuits, each branch comprising a transistor of one conductivity type serially connected to a transistor of another conductivity type. The common point between each transistor of each branch is connected to the control electrode of the transistors in the other branch. The memory state of the cell is changed by applying signals to the current conducting electrodes of the transistors of the one conductivity type. A variable source-substrate bias is selectively applied to the current conducting electrodes of the transistors of the other conductivity type to maintain these devices in the enhancement mode during standby periods and to provide for operation in the depletion mode during periods in which the cell is selected for sensing.

The foregoing and other object, features and advantages of the invention will be apparent from the following more particular description of a preferred embodiment of the invention as illustrated in the accompanying drawings.

DESCRIPTION OF THE PREFERRED EMBODIMENT

Figure 1:
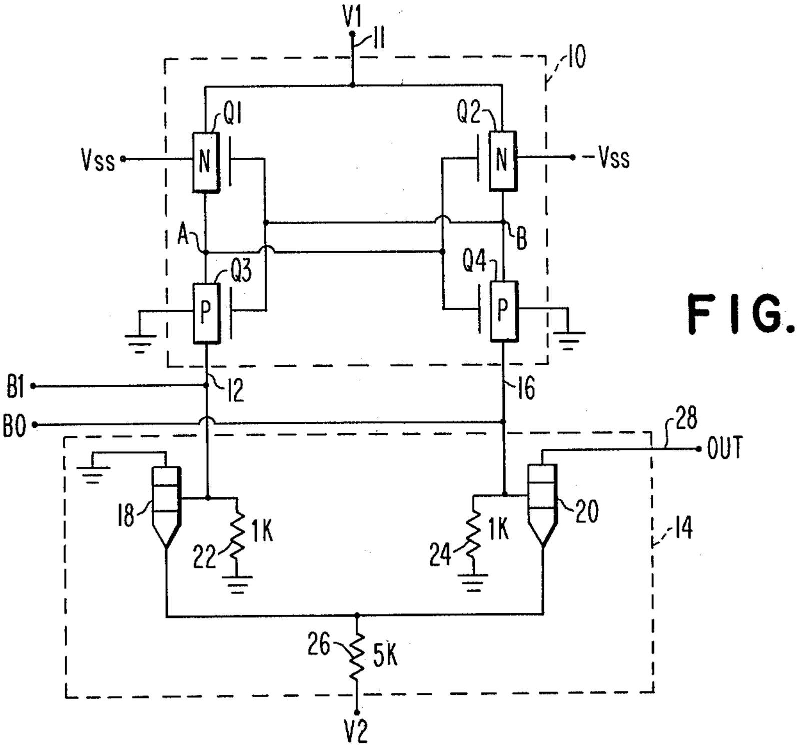
FIG. 1 is a schematic diagram of a memory cell according to the invention showing the interconnection between the complementary devices and the control circuitry necessary to operate the memory cell.

Referring to FIG. 1, there is shown a schematic circuit diagram of the memory cell of the instant invention. Memory cell 10 includes four MOS field effect transistors Q1, Q2, Q3, and Q4. A first branch of the circuit is formed by opposite conductivity type transistors Q1 (N-type) and Q3 (P-type) having their current conducting electrodes serially connected between a word line 11 connected to a source of varible negative potential V1 and a first bit line 12 connected to a sense circuit generally designated 14. A second similar branch of the circuit is formed by serially connected N-type transistor Q2 and P-type transistor Q4, also connected at one end to V1 and at the other end to a second bit line 16. In order to provide for the storage of binary signals, the connection point A in the first branch of the circuit intermediate, and corresponding to the drains of, transistors Q1 and Q3 is connected to the control electrodes, or gates, of transistors Q2 and Q4. In a similar manner, connection point B in the second branch, corresponding to the drains of Q2 and Q4, is connected to the control electrodes of transistors Q1 and Q3. The substrates of N-type transistors Q1 and Q2 are connected to a source of negative bias Vss and the substrate of transistors Q3 and Q4 are connected to circuit ground.

P-type transistors Q3 and Q4 are constructed to normally operate in the enhancement mode, that is, a negative potential is required on the gate electrode of these devices, when the source voltage equals the substrate voltage, in order to cause the transistor to conduct significant current. N-type transistors Q1 and Q2 are constructed to operate in either enhancement or depletion mode, depending upon the condition of the substrate-to-source potential, or substrate bias. More specifically, when the substrate-to-source potential equals zero volts, transistors Q1 and Q2 operate in a depletion mode, preferrably having a slightly negative threshold voltage, and are conductive. When the substrate potential is more than about 2 volts more negative than the source potential the N-type transistors operate in the enhancement mode, requiring a relatively positive potential on the gate electrode with respect to the substrate potential to conduct. Those skilled in the art will recognize that various technologies may utilized to fabricate the transistors. For example, the transistors may be fabricated on an insulating substrate or they may be fabricated on a single semiconductor slice using diffusion pockets to provide isolation between N-type and P-type devices. The required individual transistor characteristics may be provided through the use of ion implantation or other well known parameter adjusting techniques.

As previously described, bit lines 12 and 16 leading from memory 10 are connected to a circuit 14 used to read information from the cell. Sense amplifier circuit 14 comprises a current switch connected between bit lines 12 and 16 and a source of negative potential V2 and includes bipolar transistors 18 and 20 resistors 22, 24, and 26 which are used to provide a current switching circuit for determining the memory state of cell 10. The sense amplifier output is taken from output terminal 28. Also provided as part of the memory circuit connected to bit lines 12 and 16 are bit driver lines B1 and B0, which provide proper biasing of the cell to change its state when a write operation is being performed. The voltage levels applied to bit driver lines B1 and B0 are typically provided by suitable switching means, not shown, well known in the art.

In order to explain the operation of memory cell 10, the following conditions may be assumed for purposes of illustration. Negative potential V1 connected to word line 11 is switchable between −5 volts, ground and −10 volts, Vss = −10 volts, V2 = −5 volts, bit driver selection potential = −3 volts. The threshold of P-type transistors Q3 and Q4 will be assumed to be approximately −2 volts and the threshold on N-type transistors Q1 and Q2 in the enhancement mode will be assumed to be approximately +1 volt. If, for example, the cell is in an unselected or standby state, i.e., V1 = −5 volts, and that transistors Q1 and Q4 are on, i.e., in their conductive state, and transistors Q2 and Q3 are off, representing a logical 1 state. It will be seen that potential at point A will be substantially −5 volts and the potential at point B will be substantially at ground potential. The memory cell will sustain this state indifinitely as the voltage at point A is applied to the gate electrodes of transistors Q2 and Q4, sustaining their initial conditions of off and on, respectively. In a similar manner, the potential at point B sustains the on and off states of transistors Q1 and Q3, respectively.

It will be noted that since the substrate potential (−10 volts) of transistors Q1 and Q2 is more than 2 volts more negative than their source potential of −5 volts, transistors Q1 and Q2 are in the enhancement mode. Under the above condition the current drawn by cell 10 is limited to only a very small amount of actual leakage current, on the order of picoamps to nanoamps, and the cell is DC stable. No additional source of current is required to maintain the state of the cell.

When it is desired to select cell 10 for sensing, the substrate-to-source bias of N-type transistors Q1 and Q2 is set equal to 0 volts, for example, by switching the word line potential V1 to −10 volts. This substrate-to-source bias causes the mode of operation of transistor Q2 to change from a non-conductive enhancement mode to the conductive depletion mode. As Q2 begins to turn on, the potential at A goes further negative from −5 volts towards −10 volts, turning Q4 on harder. The potential at B will be lowered from ground to about −2 volts due to the voltage divider action of transistors Q2 and Q4. The potential at point B will remain sufficiently low to prevent any change in the conductive states of Q1 or Q3. With both transistors Q2 and Q4 in the second branch of the circuit conducting, a significant current flows causing transistor 20 in sense circuit 14 to provide an output response at output terminal 28, indicating that a logical 1 is stored in cell 10.

If memory cell 10 is originally in the logical 0 state, with transistors Q2 and Q3 initially on and Q1 and Q4 off, and the cell is selected, current flows through the first branch of the circuit through transistors Q1 and Q3 turning off transistor 18 and current flows at terminal 28, indicating the a logical 0 is stored in cell 10. It should be noted that the sensing of the cell is non-destructive.

Figure 2A:
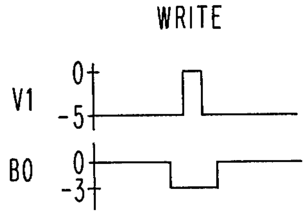
FIG. 2A and B are a graphical representation of a portion of the pulse program for operating the memory cell of FIG. 1 for two different embodiments.

In order to write data into cell 10, it is necessary to provide a selection pulse to word line 11 and to simultaneously apply a proper driving bias to the desired bit drive line B1 or B0, depending upon which state is to be written into the cell. For example, if cell 10 is initially in the logical 1 state, as previously described with Q1 and Q4 on and Q2 and Q3 off, and it is desired to change the state of the cell to the logical 0 state, a negative bit drive potential, for example −3 volts, is selectively applied to bit line drive B0. The application of −3 volts to bit line drive line B0 will lower the potential at point B to about −2 volts, thereby causing transistor Q3 to begin to turn on. As Q3 turns on, the potential at point A will rise, causing Q4 to turn off and Q2 to turn on. In order to cause Q1 to turn off it is necessary to provide a word selection pulse of ground potential to word line 11 momentarily while the bit drive potential is present to actually provide change in state of the cell. The timing of the bit drive and word line pulses is illustrated graphically in FIG. 2A, for the example described. Because both storage notes A and B of the cell have relatively low impedance path to a source of potential through the N-type transistors, the time required for a change of state is much faster than in conventional complementary cells.

Although the bit drive potential may also be concurrently applied to unselected memory cells, no change in state is affected. Consider, for example, the above described memory cell in which the substrate-to-source bias, Vss to V1, is maintained negative while a bit drive potential of −3 volts is applied to bit drive line B0. If the cell is in the logical 0 state transistor Q4 will be off and the applied bit drive potential will not affect the voltage level on point A or B. If the cell is on the logical 1 state transistor Q4 will be on allowing the potential at point B to be moved to approximately −3 volts, since the transistor Q2 is off. The −3 volt potentail at point B will tend to turn on Q3, but as long as transistor Q1 is turned on harder than Q3 the potential at point A will remain at approximately −5 volts, which is sufficient to maintain the state of the memory cell, even though some current will flow in the first branch of the circuit. Proper selection of the bit drive potential is determined by the specific operating characteristics of the transistors.

Figure 2B:
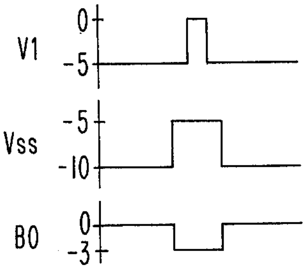

It will be recognized by those skilled in the art that N-type transistors Q1 and Q2 may be selectively operated in the enhancement of depletion mode by maintaining the source of potential V1 and by varying substrate potential Vss to provide the required substrate-to-source bias. That is, the potential V1 may be fixed and the potential Vss applied to the substrates of N-channel devices may be selectively varied. Those skilled in the art will also recognize that it will still be necessary to momentarily pulse V1 to ground in order to enable the initially on N-type transistor, Q1 or Q2, to turn off. FIG. 2B illustrates the pulse program necessary when substrate bias Vss is used as a variable control signal. It will also be recognized that the conductivity types of a transistor may be reversed, provided appropriate polarity changes are made to the voltage potential supplies.

The specific sense amplifier circuit shown in FIG. 1 is utilized only for purposes of illustration as many additional detection circuits well known in the art may also be utilized effectively. Is some applications a differential sense amplifier may be preferred to provide positive indications of both 0 and 1 logical outputs. The sense amplifier circuit may also be physically located on a separate semiconductor chip from the memory array circuit.

Figure 3:
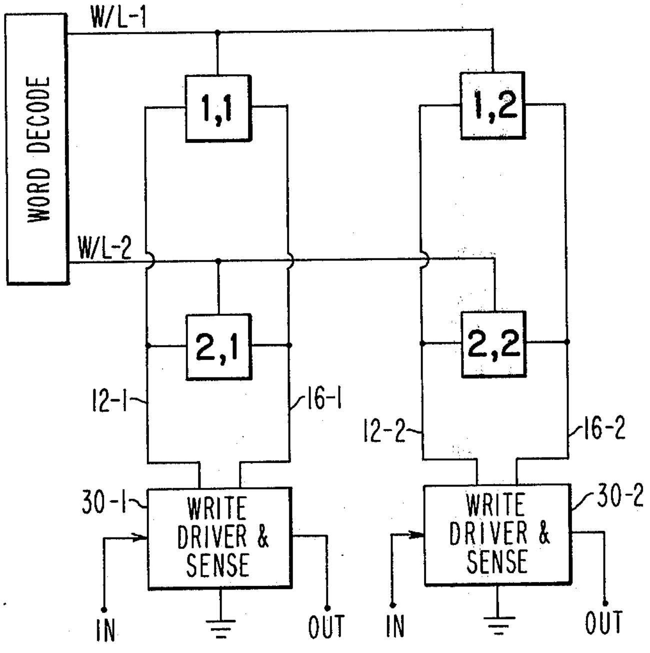
FIG. 3 is a schematic diagram of a plurality of cells of FIG. 1 connected an array to show the operation of the memory cells in a typical memory environment.

Referring now to FIG. 3, there is shown a typical word-organized memory utilizing the memory cell of FIG. 1. For purposes of illustration, a 2 × 2 array of memory cells 10 is shown, however, any size array may be provided in a similar manner. To simplify the drawing, the connections to fixed sources of potential have been omitted and the bit drive means and sense amplifiers have been combined in a single write driver and sense amplifier means 30. The storage positions of memory cell 10 are identified within the array by the designation (N,M) where N represents a word-line and the M represents a bit position within a word. If it is desired to sense the logical state of storage position (1,1) a selection pulse of −10 volts is applied to W/L-1 by a conventional word decoder circuit 30 while word line W/L-2 is maintained at −5 volts. The presence of the selection pulse caused the N-type transistors associated with selected W/L-1 to operate in the depletion mode, as previously described, causing current to flow in one of the bit lines of each of the memory cells associated with word 1, depending upon the particular state of each memory cell 10.

If it is desired to write data into a particular cell, a bit drive potential of −3 volts is provided by one, or more, of write driver and sense amplifier 30 on either bit line 12 and 16 associated with a particular bit position to be written. For example, if a logical 1 is to be written storage cell (2,2), word line W/L-2 is pulsed to ground potential which selects word 2, and a potential of −3 volts is applied to bit line 12-2. If storage cell (2,2) was previously in a logical 1 state, no change takes place. However, if the cell was previously in the logical 0 state, its state will be changed.

Those skilled in the art will recognize that additional techniques may be used for writing information into the memory cells of the invention. For example, optical inputs may be provided to control the state of conduction of the various transistors during a write cycle.

While the invention has been particularly shown and described with reference with to preferred embodiments thereof, it will be understood that by those skilled in the art that the foregoing, and other changes in form and details may be made therein without departing from the spirit and scope of the invention.

What is claimed is:

1. A memory circuit having a selected state and a quiescent state, comprising:

a four transistor storage cell, each transistor having a first and second current conducting electrode, a control electrode and a substrate electrode, said storage cell comprising first and second branch circuits, each branch circuit including a first conductivity type transistor and a second type conductivity type transistor having their first current conducting terminals connected to a common point, said common point in each branch circuit also being connected to the control electrodes of the transistors in the other branch circuit, and common control signal bias means connected between the second current conducting terminal of said first conductivity type transistor in each branch circuit and its substrate terminal, said bias means providing a first bias condition for sustaining said first conductivity type transistors in enhancement mode during said quiescent state causing substantially zero current to flow in said branch circuits and providing a second bias condition causing at least one of said first conductivity type transistors to operate in a depletion mode during said selected state causing substantial current to flow in one of said branch circuits.

2. The memory circuit of claim 1 further including means for applying a reference potential to the second current conducting electrode of said second conductivity type transistor in each of said branch circuits at least during said quiescent state.

3. The memory circuit of claim 2 further including means connected to the second current conducting terminal of said second conductivity type transistors of at least one of said branch circuits for determining the presence of current flowing in said branch circuit during said selected state.

4. The memory circuit of claim 3 further including means for selectively applying a driving potential to one of said second current conducting terminals of said second conductivity type transistors during said selected state to provide a change in the logical state of said storage cell.

5. The memory circuit of claim 1 where said control signal bias means comprises a fixed bias potential connected to the substrate terminals of said first conductivity type transistors and a variable bias potential connected to said second current conducting terminals of said first conductivity type transistors, said second variable bias potential having different potential levels corresponding to said selected and quiescent states.

6. The memory circuit of claim 1, wherein said first conductivity type transistors are N-type field effect transistors and said second conductivity type transistors are P-type field effect transistors.

7. The memory circuit of claim 2 further including substantially equal load impedance means connected to the second current conducting terminal of each second conducting type transistors.

8. The memory circuit of claim 7 wherein at least one of said load impedance means includes a sense amplifier circuit.

9. a memory system comprising:

a plurality of word lines;

a plurality of first bit lines;

a plurality of second bit lines;

a plurality of memory cells, each memory cell comprising; four field effect transistors connected in a first and second branch circuit, each branch circuit including a P-type transistor having its drain connected to the drain of a N-type transistor, the drains of the transistors in each branch circuit being connected to the gates of the transistors in the other branch circuit, the source of each N-type transistor being connected to one of said word lines, the source of one of said P-type transistors being connected to one of said first bit lines and the source of the other said P-type transistors being connected to one of said second bit lines;

means for establishing a potential between said word lines and said first and second bit lines for sustaining binary logical states in said memory cells in a stable quiescent state;

signal control means associated with said N-type transistors for selectively causing at least one of said N-type transistors to operate in a depletion mode to provide current flow in one of said branch circuits between a selected word line and at least one of said bit lines during an selected state; and means for determining the presence of current flow in said second bit lines for providing an indication of the logical state of each of said memory cells during said selected state.

10. The memory system of claim 9 wherein said signal control means comprises a source of fixed negative substrate bias potential connected to the substrates of N-type transistors and means for varying the potential applied to said word lines to cause said N-type transistors to operate in enhancement mode during said quiescent state and in depletion mode during said selected state.

11. The memory system of claim 9 further including variable drive potential means connected to said bit lines for selectively changing the logical state of said memory cells during said selected state.

12. The memory system of claim 10 wherein said means for varying the potential applied to said word lines includes means to provide a reverse substrate-to-source bias during said quiescent state and substantially zero substrate-to-source bias during at least a portion of the time said cell is in said selected state.

* * * * *